No. 829,556. PATENTED AUG. 28, 1906.
A. L. WARREN.
COTTON CHOPPER AND CULTIVATOR.
APPLICATION FILED JAN. 3, 1906.
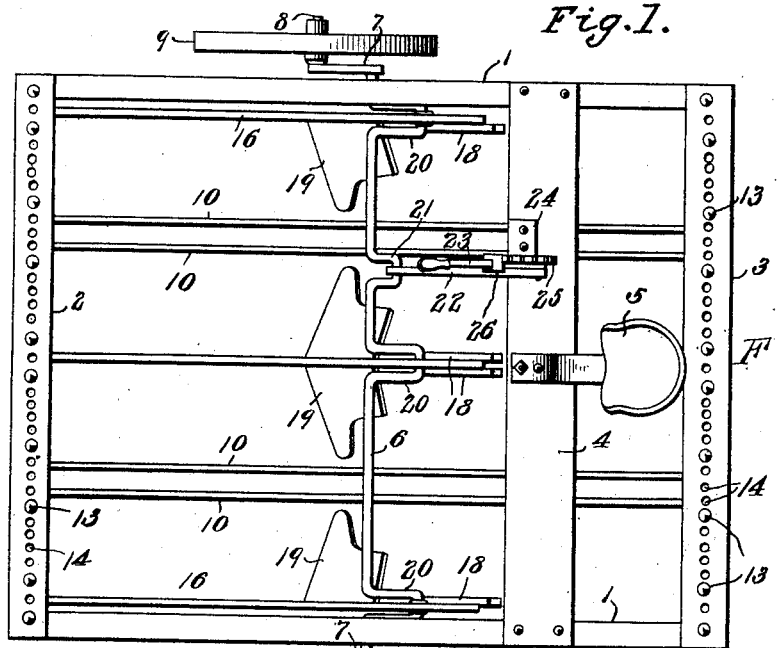
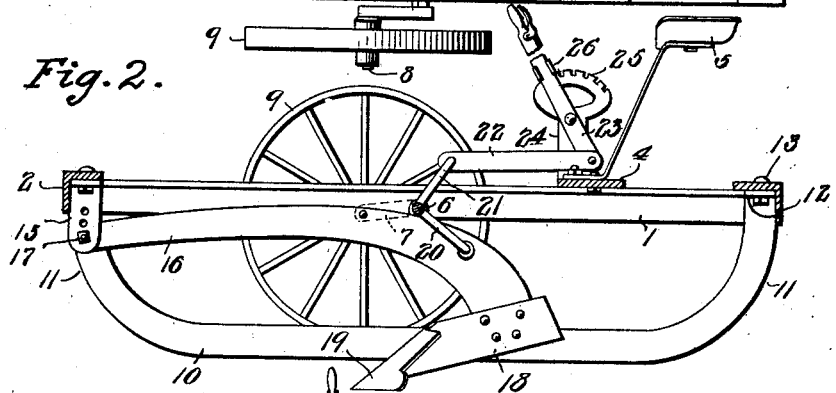
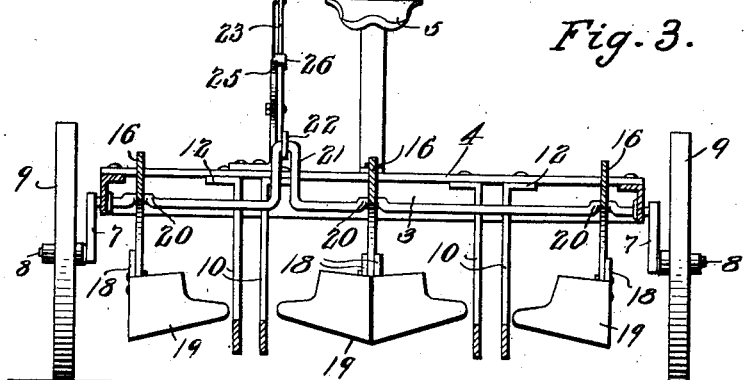
WITNESSES:
Andrew L. Warren, INVENTOR
By C. A. Snow & Co.
ATTORNEYS

UNITED STATES PATENT OFFICE.

ANDREW L. WARREN, OF LONE WOLF, OKLAHOMA TERRITORY.

COTTON CHOPPER AND CULTIVATOR.

No. 829,556.      Specification of Letters Patent.      Patented Aug. 28, 1906.

Application filed January 3, 1906. Serial No. 294,448.

*To all whom it may concern:*

Be it known that I, ANDREW L. WARREN, a citizen of the United States, residing at Lone Wolf, in the county of Kiowa, Oklahoma Territory, have invented a new and useful Cotton Chopper and Cultivator, of which the following is a specification.

This invention relates to combined cotton-choppers and cultivating implements; and it has special reference to that class of cotton-choppers which are operated across the rows for the purpose of thinning the crop by removing the superfluous plants.

The objects of the invention are to simplify and improve the construction and operation of this class of devices and to provide an implement which may be efficiently used not only as a cotton-chopper, but also for the purpose of cultivating cotton, corn, and other plants growing in rows or hills; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a top plan view of an implement constructed in accordance with the principles of the invention. Fig. 2 is a longitudinal vertical sectional view of the same. Fig. 3 is a vertical transverse sectional view.

Corresponding parts in the several figures are indicated throughout by similar characters of reference.

The frame F of the improved machine is of rectangular form, and in the construction thereof angle-irons are preferably employed, 1 1 designating the side pieces, and 2 3 the front and rear cross-bars of the frame. An intermediate cross-bar 4 is also provided upon which the seat 5 is supported. The side members of the frame afford bearings for the axle 6, which is provided at its ends with cranks 7, having spindles 8, upon which the carrying-wheels 9 are journaled.

The frame is provided with pairs of longitudinally-disposed runners 10 10, the front and rear ends of which are curved upwardly, as shown at 11, and provided with laterally-extending brackets 12, secured by means of bolts, as 13, upon the under sides of the front and rear cross-bars 2 of the frame. Said front and rear cross-bars are provided with numerous apertures or bolt-holes 14 to enable the pairs of runners to be secured in various positions and to enable the runners of each pair to be spaced at various distances apart. The front cross-bar 2 is also provided with depending brackets, as 15, with which the front ends of beams 16 are pivotally connected by means of bolts 17. The beams are provided with standards 18, carrying hoes or blades 19 of suitable construction.

The axle 6 is provided with cranks 20, pivotally engaging and supporting the beams 16, and said axle is also provided with a crank 21, which is connected by means of a link 22 with a hand-lever 23, fulcrumed upon a standard 24, which is supported upon the cross-bar 4 of the frame, said standard having a rack-segment 25 engaged by a stop member 26 upon the lever, which latter may thus be retained in any of the various positions to which it may be adjusted and likewise securing the axle, which may be rocked to various positions by means of the said lever. It will be observed that the wheel-carrying cranks 7 and the beam-carrying cranks 20 extend in opposite directions or radiate in different directions from the shaft or axle and that the crank 21, connected with the lever whereby the axle is rocked, is located at an angle to both the cranks 7 and 20. Hence when the axle is rocked in one direction the beams will be elevated and the carrying-wheels will be lowered to support the frame for transportation, while by rocking the axle in the opposite direction the carrying-wheels will be elevated and the beams will be lowered, so as to place the hoes or blades carried thereby in ground-engaging position for operation, the machine being supported for operation upon the runners 10, which also constitute fenders for the plants that are being operated upon.

The improved implement may be made of any desired dimensions and may be made to include any desired number of beams and pairs of runners. In its preferred form, however, which has been illustrated in the drawings, two pairs of runners will preferably be employed, the beam between the runners being equipped with a double shovel or hoe, while the beams adjacent to the outer runners are equipped with single blades or hoes. These blades or hoes may be made to throw the dirt either toward or from the plants.

When the machine is used as a cotton-chopper or for the purpose of thinning growing plants, it is driven across the rows, and the plants between the runners of each pair are left standing, while those between the pairs of runners and adjacent to the outer runners will be uprooted and exterminated. When the device is used for a cultivator, it is driven lengthwise of the rows of plants, the plants passing between the runners of each pair, which serve as guards or fenders to protect the plants, while grass and weeds growing between the pairs of runners and adjacent to the outer runners will be uprooted and exterminated.

As will be seen from the foregoing description, the improved machine is very simple in construction, and it may be constructed and maintained at a small expense. At the same time it has proved to be thoroughly efficient for the purposes for which it is provided.

Having thus described the invention, what is claimed is—

1. In a machine of the class described, a frame, pairs of runners connected with and adapted to support said frame, a rocking axle having terminal wheel-carrying cranks, tool-carrying beams connected pivotally with the frame, cranks upon the axle extending oppositely to the wheel-carrying cranks and connected with the tool-carrying beams, and means for rocking the axle for securing it at various adjustments.

2. In an implement of the class described, a rectangular frame, pairs of runners having upwardly-curved front and rear ends provided with laterally-extending brackets, means for connecting said brackets adjustably with the front and rear cross-bars of the frame, auxiliary brackets depending from said cross-bars between the pairs of runners and adjacent to the outer runners, tool-carrying beams connected with said brackets, a rocking axle having bearings in the sides of the frame and provided with terminal wheel-carrying cranks, and intermediate cranks extending from the axle oppositely to the wheel-carrying cranks and having pivotal connection with the tool-carrying beams; in combination with lever means for rocking the axle and for securing it at various adjustments.

In testimony that I claim the foregoing as my own I have hereto affixed my signature in the presence of two witnesses.

ANDREW L. WARREN.

Witnesses:
E. S. LAWRENCE,
F. ALEXANDER.